July 25, 1967
T. M. LOWRY
3,332,337
POSITIVE SHUTOFF SEMIAUTOMATIC BEVERAGE BREWER
Filed Feb. 2, 1966
2 Sheets-Sheet 1
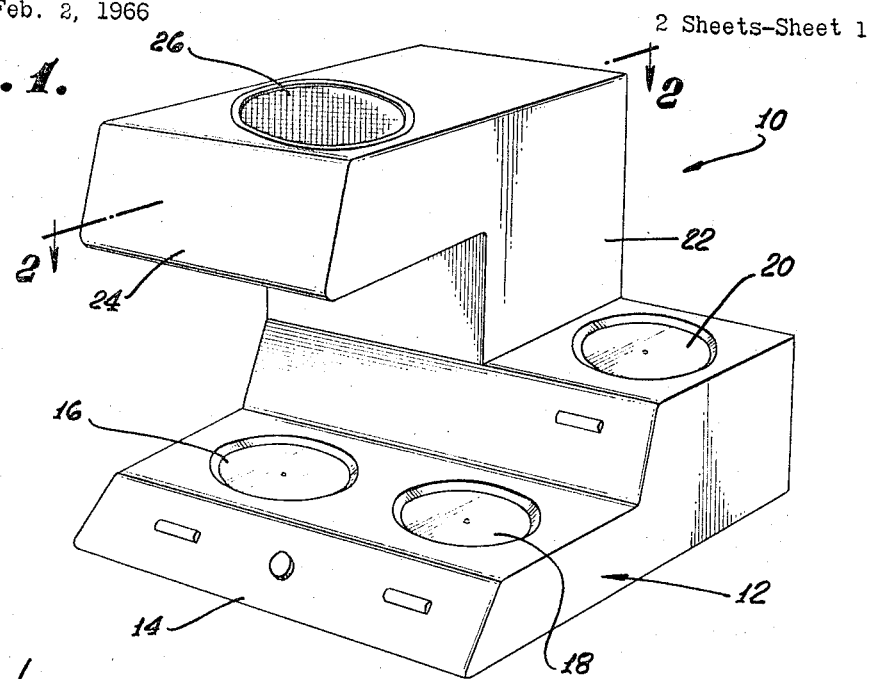
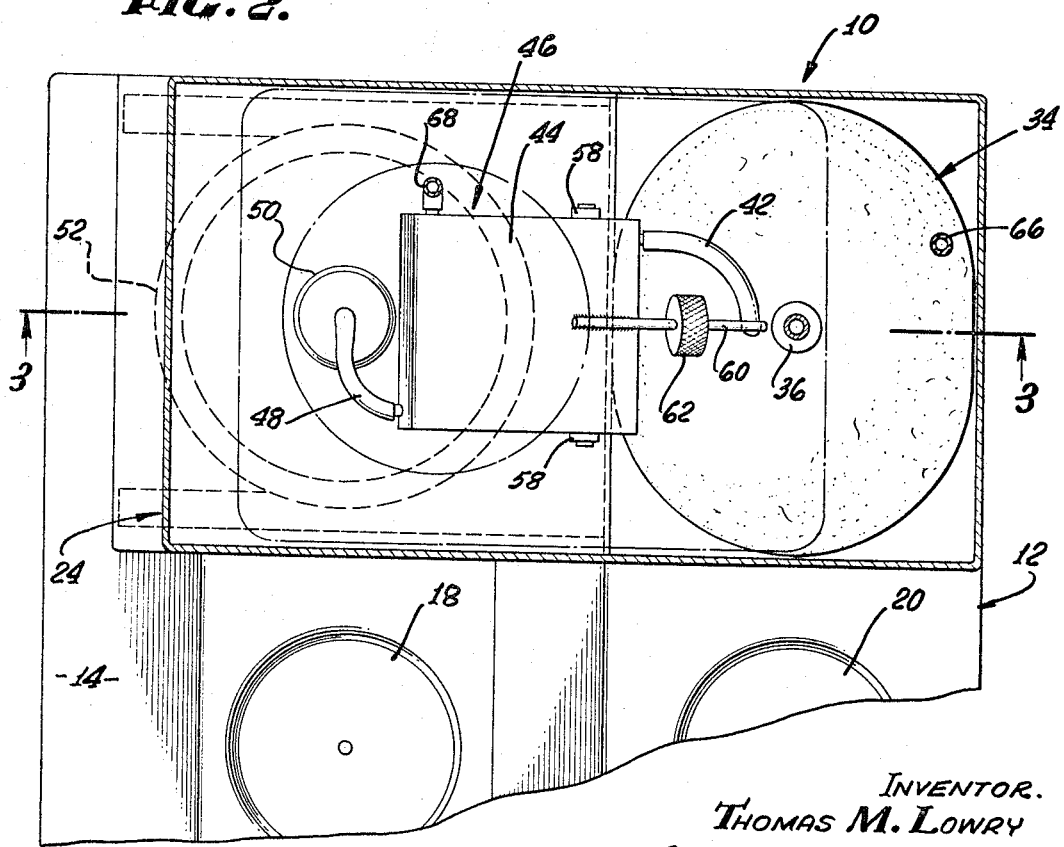
INVENTOR.
THOMAS M. LOWRY
By Huebner & Worrel
ATTORNEYS.

July 25, 1967     T. M. LOWRY     3,332,337
POSITIVE SHUTOFF SEMIAUTOMATIC BEVERAGE BREWER
Filed Feb. 2, 1966     2 Sheets-Sheet 2
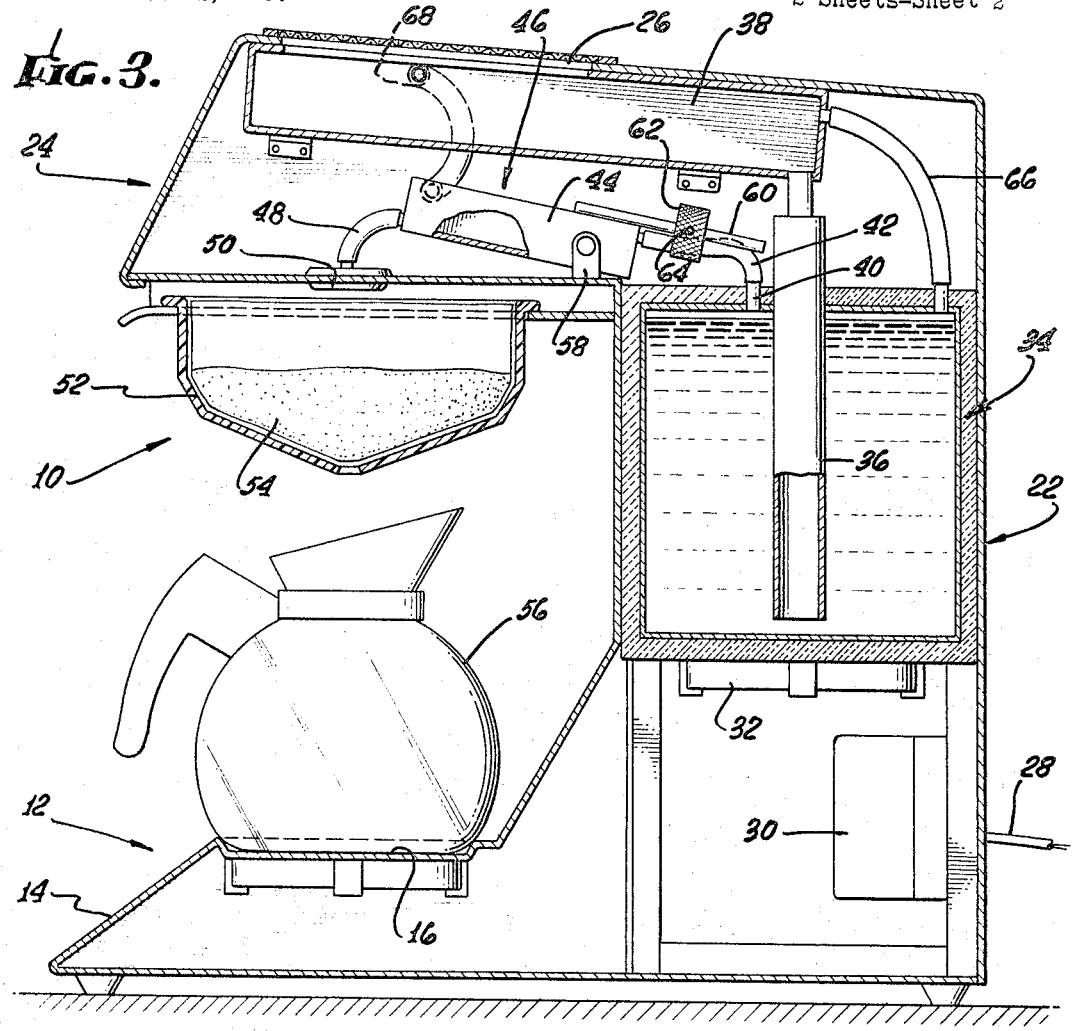
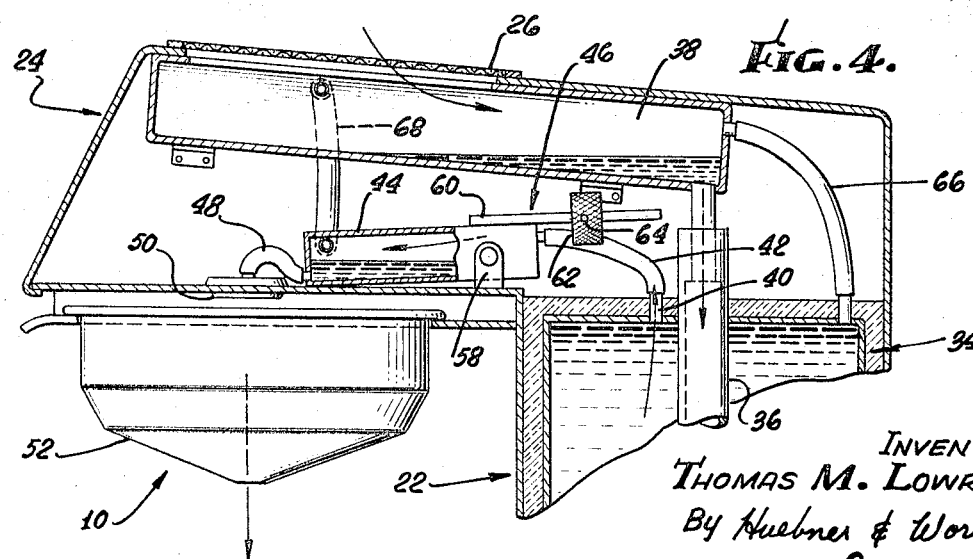
INVENTOR.
THOMAS M. LOWRY
By Huebner & Worrel
ATTORNEYS.

United States Patent Office 3,332,337
Patented July 25, 1967

3,332,337
POSITIVE SHUTOFF SEMIAUTOMATIC BEVERAGE BREWER
Thomas M. Lowry, Pico Rivera, Calif., assignor to Wilbur Curtis Co., Inc., Los Angeles, Calif., a corporation of California
Filed Feb. 2, 1966, Ser. No. 524,524
8 Claims. (Cl. 99—282)

The present invention relates to apparatus for brewing beverages such as coffee, and it relates more particularly to beverage brewing apparatus of the semiautomatic type wherein water is continuously maintained heated in a reservoir, and when it is desired to brew a quantity of the beverage, a corresponding amount of further water, which may be cold, is introduced into the apparatus and fed into the bottom portion of the hot water reservoir, thereby overflowing hot water from the top of the reservoir through a beverage-producing material such as ground coffee beans and into a suitable container such as a decanter.

It is known to provide semiautomatic coffee-brewing apparatus for brewing up to about 12 cups of coffee, which is the quantity held by the conventional coffee decanter, utilizing the hot-water overflow principle which permits a given quantity of cold water to be poured into the apparatus, and simultaneously the apparatus will brew a corresponding amount of fresh coffee. In such apparatus, the cold water is introduced into the lower portion of a hot water reservoir which is thermostatically kept at brewing temperature in the apparatus, and introduction of this cold water raises the water level and causes an overflowing of hot water from the top of the reservoir through a suitable cartridge which contains ground coffee beans, the freshly brewed coffee then dripping into a decanter set below the cartridge. This type of semiautomatic coffee-brewing apparatus is particularly convenient for small restaurants and business establishments where it is desirable to prepare a fresh decanter of coffee at intervals during the day.

However, semiautomatic coffee brewing apparatus of this type has the objectionable inherent characteristic of excessive drippage after each cycle of operation. This is because after a given quantity of cold water is introduced into the apparatus and has displaced an exactly equal amount of hot water to accomplish the brewing operation, there will be an interval of time during which the newly introduced cold water will be heated up to the operating temperature of the water in the reservoir. Such heating will be accompanied by expansion of the water which was introduced, with a resulting slow overflow which will cause the objectionable drippage.

One means has heretofore been proposed in Reissue Patent No. 25,663 as an attempt to solve this problem of drippage. The means suggested in said Reissue Patent No. 25,663 consisted of a syphon tube employed between the upper end of the hot water tank and the discharge head for discharging water to the coffee grounds, and this syphon tube was supposed to cut off the flow of hot water in such a way that the expansion of the added cold water would not be sufficient to re-initiate the flow of hot water through the syphon tube. However, such a syphon flow control device requires that substantially a full twelve-cup decanter of water be added to the apparatus in order for there to be any reasonable accuracy in the quantity of hot coffee that is brewed in a particular cycle, and such equipment is not sufficiently accurate for the brewing of small amounts of coffee, such as from about one to six cups. Additionally, such syphon flow control means does not actually effect a clean cutoff of the hot water flow, but terminates the flow in a manner which allows considerable drippage at the termination.

In view of these and other problems in the art, it is an object of the present invention to provide beverage brewing apparatus particularly adapted for brewing hot coffee, which operates on the hot water overflow principle wherein a given quantity of cold water is added to the apparatus and flows into the bottom portion of a hot water tank, causing hot water to overflow from the top part of the tank and pass through coffee grounds so as to brew the hot coffee, wherein the fluid passage means which conducts the hot water from the top of the reservoir to a discharge head above the coffee grounds includes movable valve means automatically operable in response to the substantial cessation of flow of the hot water to provide a positive shutoff of the hot water without substantial drippage thereafter, and which will require a substantial increase in the volume of water in the reservoir to shift the valve means back to the flow position.

Another object of the present invention is to provide semiautomatic beverage brewing apparatus of the character described wherein said positive shutoff valve means is gravity actuated so as to be moved from its closed to its open position when substantially filled with hot water during a brewing cycle, and so as to shift to the positive shutoff position when the quantity of hot water in thhe valve means itself is substantially reduced.

A further object of the invention is to provide beverage brewing apparatus of the character described wherein said positive shutoff valve means is a weight-balanced, pivoted water trap device forming a part of the flow conduit from the hot water reservoir to the discharge head above the coffee grounds or other material through which the hot water passes for brewing the beverage.

Further objects and advantages of the present invention will appear during the course of thhe following part of the specification, wherein the details of construction and mode of operation of a presently preferred embodiment are described with reference to the accompanying drawings, in which:

FIGURE 1 is a perspective view of semiautomatic coffee brewing apparatus according to the present invention.

FIGURE 2 is a horizontal section taken on the line 2—2 in FIGURE 1, with portions in elevation, illustrating the valve means of the present invention in top plan.

FIGURE 3 is a vertical section taken on the line 3—3 FIGURE 2, illustrating the coffee brewing apparatus arranged preparatory to a brewing cycle, with the hot water reservoir substantially full, with coffee grounds in the cartridge provided therefor, and with the positive shutoff valve means of the invention in its closed position.

FIGURE 4 is a fragmentary view similar to FIGURE 3, but showing the apparatus in the middle of a brewing cycle, with cold water being introduced through the top of the apparatus so as to flow into the bottom of the hot water reservoir and force hot water through the transfer conduit means to the discharge head above the coffee ground cartridge, and with the positive shutoff valve means of the present invention in its open position allowing the flow of hot water therethrough.

Referring to the drawings, and at first particularly to FIGURE 1 thereof, presently preferred coffee brewing apparatus 10 according to the invention includes a base portion 12 having a forward control panel 14 and hot plates 16, 18 and 20 adapted to receive conventional coffee decanters thereon. The apparatus includes an upwardly extending portion 22 which projects upwardly from the rear of the base, with a forwardly extending upper portion 24 projecting forwardly from the portion 22 and overlying the hot plate 16. The upper portion 24 has in its top wall a relatively large screened opening 26 which is adapted to have a quantity of cold water poured therethrough to initiate a brewing cycle of the apparatus.

Referring now to FIGURES 2, 3 and 4 of the drawings, electric current is provided through a cord 28 which extends from the rear of the apparatus and which connects with a suitable junction box 30 from which electricity is distributed to the various electrical heating elements of the apparatus. Thus, electric current is provided from the junction box 30 to each of the three hot plates 16, 18, and 20, and also to a thermostatically controlled heating element 32 which is connected to the bottom portion of an insulated hot water reservoir 34 located in the upwardly extending portion 22 of the apparatus. Preferably, the heating element 32 that is associated with reservoir 34 will maintain hot water in the reservoir 34 at a temperature close to the boiling point of water as for example at about 210° F., for sea level conditions, so as to provide maximum efficiency in the extraction of the more important flavor-producing ingredients from the ground coffee.

A standpipe 36 is centrally located in the reservoir 34, opening just above the bottom of the reservoir 34 and extending upwardly through the upper wall of the reservoir, and connecting at its top with a generally wide, flat cold water entry tank 38 located just under the top wall of the apparatus. The cold water entry tank 38 communicates directly with the screened opening 26, and extends rearwardly in a downward incline to the connection with standpipe 36 at its rear end. In this manner, when a quantity of cold water is poured into the entry tank 38 through the screened opening 26, it will flow rearwardly through the entry tank 38 and thence downwardly through the standpipe 36 and out into the bottom of the reservoir 34. This will then displace hot water from the top of the reservoir 34 through hot water transfer conduit means next to be described.

The hot water transfer means includes a fitting 40 in the top wall of reservoir 34 which communicates with the inside of reservoir 34 at its top and projects upwardly therefrom. Connected to the fitting 40 is a flexible tube 42 which extends laterally and upwardly to a connection with a container 44 which forms a part of valve means 46 that comprises the positive shutoff valve means of the present invention. The connection of flexible tube 42 with the container part 44 of the valve means 46 is at the rear of container 44. Another flexible tube 48 provides a connection from the front end of the valve container 44 to hot water discharge head 50 located directly above removable cartridge 52 within which ground coffee 54 is disposed. Disposed directly underneath the cartridge 52 is a conventional coffee decanter 56.

The valve container 44 is pivoted on a substantially horizontal axis generally to the rear of its center of gravity, spaced ears 58 projecting upwardly from the bottom wall of the forward upper portion 24 of the apparatus to provide suitable pivots for this purpose.

An arm 60 extends rearwardly from the top of the valve container 44, and a slidably adjustable balancing weight 62 is mounted on this arm 60. The weight 62 can be affixed at any desired point on the arm 60 by means of a set screw 64.

Steam vent tubes 66 and 68 are also provided, the vent tube 66 extending from the top of reservoir 34 to the upper portion of the cold water entry tank 38, and the vent tube 68 extending from the top portion of the valve container 44 to the upper portion of the cold water entry tank 38.

FIGURES 2 and 3 illustrate the condition of the various parts of the apparatus preparatory to a coffee-brewing cycle. The cartridge 52 has a desired quantity of ground coffee 54 therein and is engaged directly below the hot water discharge head 50. A decanter 56 is positioned on the hot plate 16 directly below the cartridge 52 so as to be adapted to receive the freshly brewed coffee when it pours out of the bottom of the cartridge. The balancing weight 62 is affixed longitudinally on the balancing arm 60 at a position wherein the weight 62 will more than counterbalance the weight of the substantially empty valve container 44, whereby the forward portion of the valve container 44 (i.e., the portion forward of the pivot) is tilted upwardly.

In order to initiate the brewing cycle, all that is required is to pour a quantity of water through the screened opening 26 into the cold water entry tank 38. The quantity of cold water thus introduced into tank 38 will produce a like quantity of hot brewed coffee when the cycle is complete. The amount of cold water thus introduced into tank 38 can be any amount between about one cup and about twelve cups. As is best illustrated in FIGURE 4, this cold water will flow rearwardly in the entry tank 38 and downwardly through the standpipe 36 so as to be introduced into the bottom of the reservoir 34. As this cold water flows into the bottom of reservoir 34, it will displace a similar quantity of hot water from the top of the reservoir 34, the reservoir being substantially full of hot water at the initiation of the cycle. This hot water will flow upwardly through the fitting 40 and flexible tube 42 into the valve container 44, and when it reaches a sufficient height in the valve container 44 its weight added to the weight of the forward portion of the container 44 will cause the valve container 44 to pivot anticlockwise from the position of FIGURE 3 to the position of FIGURE 4, allowing the hot water to flow out through the forward flexible tube 48 and discharge 50 into the ground coffee 54. This flow will continue at a rate determined by the pressure head from the entry tank 38 and the size of the transfer conduit means until substantially all of the cold water has flowed from the entry tank 38 down into the reservoir 34 and displaced a generally similar quantity of hot water. Then, when the flow of hot water is about to cease, the water level in the forward portion of the valve container as illustrated in FIGURE 4 will drop, and there will be a point in this level at which the weight 62 will then more than counterbalance the weight of the valve container 44 and the water therein, at which point the valve container 44 will pivot back in a clockwise direction to the position of FIGURE 3. This will cause any remaining water in the container 44 to flow rearwardly in the container 44, which will considerably decrease the anticlockwise torque applied by the forward part of the valve container 44, and will in fact result in this water being rearward of the pivot's axis, whereby it will assist the weight 62 in a clockwise torque, thus positively securing the container 44 in its upwardly tilted position of FIGURE 3 until another cycle is initiated.

The flow of hot water through the transfer conduit means which includes the fitting 40 flexible tubes 42 and 48, valve container 44 and discharge 50, will be relatively slow for best coffee brewing results. This will allow a substantial period of time for the heating of the cold water which is entering into the bottom of the reservoir 34. However, the cold water will not be entirely heated at the end of the cycle, and there will be some further heating thereof, which will result in a certain amount of expansion after the coffee brewing cycle has been completed. While this will tend to cause a small amount of hot water to move upwardly through the fitting 40 and tube 42 into the valve container 44, this will only raise the water level slightly in the valve container 44, and will not in any case be sufficient to counterbalance the weight 62 when the weight 62 is properly positioned on the balancing arm 60.

It will be apparent that the present invention permits the brewing of any quantity of coffee up to the capacity of the unit, regardless of how small a quantity, with an accurately determined amount of coffee being brewed, and with a positive shutoff at the end of the brewing cycle despite further expansion which may occur in the reservoir due to the heating of cold water which was introduced.

While the instant invention has been shown and described herein in what is conceived to be the most practical and preferred embodiment, it is recognized that de-

I claim:

1. Semiautomatic beverage brewing apparatus which comprises support means, a generally closed hot water reservoir supported by said support means and having thermostatically controlled heating means connected thereto for maintaining hot water within the reservoir at a beverage brewing temperature, water entry conduit means having an opening located above the reservoir and communicating with the inside of the reservoir in the lower portion thereof, and hot water transfer conduit means extending from the reservoir proximate its top to a discharge head spaced from said reservoir and positioned so that hot water discharged therefrom will flow through a beverage producing material, said transfer conduit means including valve means movable between a closed position wherein it blocks the flow of hot water through said transfer conduit means and an open position wherein it allows the flow of hot water through said transfer conduit means, said valve means including biasing means urging it toward said closed position and including means responsive to the weight of hot water in a portion of said transfer conduit means for opening the valve means against the force of said biasing means when the hot water in said transfer conduit means reaches a predetermined level, whereby water introduced into said entry conduit means will displace hot water in the reservoir and cause hot water to rise in said transfer conduit means, thereby opening said valve means to allow the flow of hot water therethrough for brewing a beverage, and said valve means will automatically shut off the flow of hot water through said transfer conduit means when the level of the hot water in said transfer conduit means again falls below a predetermined level.

2. Apparatus as defined in claim 1, wherein said valve means comprises a container pivotally mounted on a generally horizontally pivot axis, said transfer conduit means including inlet and outlet ports of said container, said outlet port being in a lowermost position in said open position of the valve means and in an uppermost position in said closed position of the valve means.

3. Apparatus as defined in claim 1, wherein said biasing means comprises gravity actuated weight means.

4. Apparatus as defined in claim 1, wherein said valve means comprises a container pivotally mounted on a generally horizontal pivot axis, said container being in the line of flow of hot water through said transfer conduit means, said container having a major portion of its volume on one side of said pivot axis, said portion of the container being pivoted to an uppermost position in said closed position of the valve means and being pivoted to a lowermost position in said open position of the valve means, said container having inlet and outlet hot water ports at least one of which is substantially spaced from said pivot axis on said one side thereof, so as to shift a substantial amount vertically upwardly when the valve means moves from its open position to its closed position.

5. Apparatus as defined in claim 4, wherein said one port is the outlet hot water port.

6. Apparatus as defined in claim 4, wherein a substantial minor portion of said container is on the other side of the pivot axis.

7. Apparatus as defined in claim 6, wherein said inlet port is in said minor portion of the container and said outlet is in said major portion of the container.

8. Apparatus as defined in claim 7, wherein said biasing means comprises gravity actuated weight means on the same side of said pivot axis as said minor portion of the container.

References Cited
UNITED STATES PATENTS

| | | | |
|---|---|---|---|
| 971,259 | 9/1910 | Effantin | 222—166 |
| 2,721,511 | 10/1955 | Hickey | 99—282 |
| 2,786,408 | 3/1957 | Herrera | 99—283 |
| 2,827,845 | 3/1958 | Richeson | 99—282 |
| 3,179,035 | 4/1965 | Lockett | 99—282 |
| 3,220,334 | 11/1965 | Martin | 99—282 |
| 3,261,279 | 7/1966 | Kaplan et al. | 99—307 |

WALTER A. SCHEEL, *Primary Examiner.*

R. W. JENKINS, *Assistant Examiner.*